Nov. 24, 1959        E. H. TURNER        2,914,361
BALANCES
Filed Jan. 3, 1957
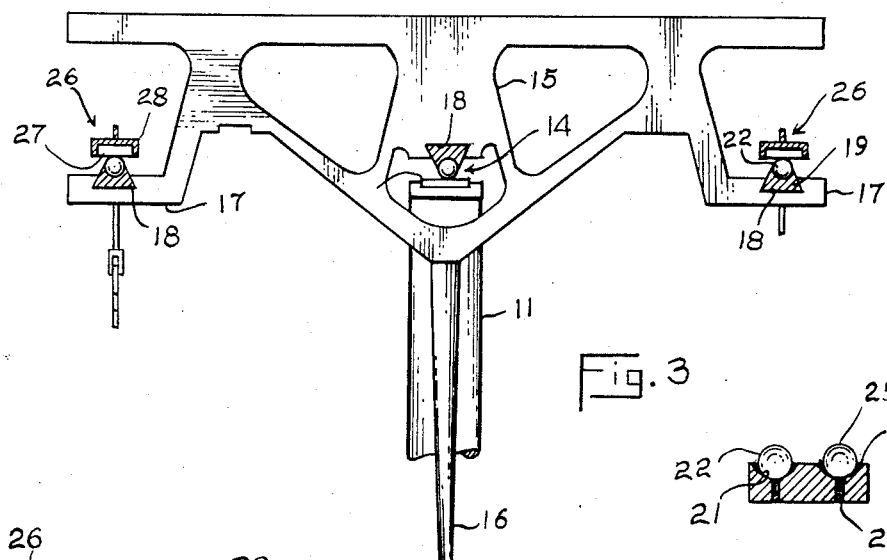
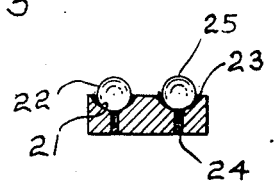
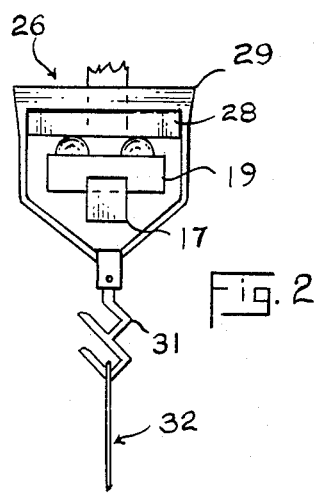
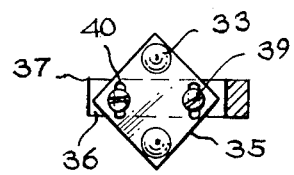
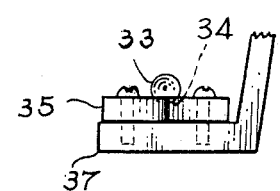
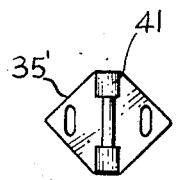
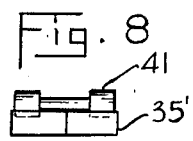
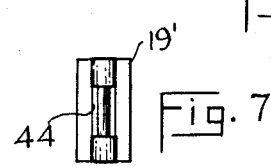
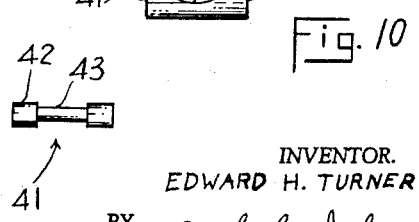
INVENTOR.
EDWARD H. TURNER
BY Nicholas J. Garofalo
Attorney

United States Patent Office 2,914,361
Patented Nov. 24, 1959

2,914,361

BALANCES

Edward H. Turner, New Hyde Park, N.Y.

Application January 3, 1957, Serial No. 632,356

8 Claims. (Cl. 308—2)

This invention pertains to weighing machines. More particularly, it is concerned with new and useful improvements in the pivot points of such machines. While the invention is subject to wide application, it is particularly suited in balances, such as precision balances; examples of which are analytical and assay balances. Conventional balances of this type include a balance beam centrally fulcrumed on a knife edge and carrying a knife edge in each arm on which is pivoted a bearing block supporting a suspended scalepan.

A knife edge is a sharp elongated wedge of hard material; such as, stone agate, sapphire, or boron carbide. Because of the hardness of the material and the sharpness required of the fulcrum edge, a knife edge is difficult to grind and, consequently, is very expensive. Apart from the cost thereof, a knife edge has other disadvantages. Because of its brittleness and the sharpness of its fulcrum edge, a knife edge has a tendency to fly or chip. Replacement is, accordingly, expensive. Flying or chipping of the knife edge can result from carelessness in handling the scalepans, accidental bumping, overloading, and other causes. Because of the tendency of the knife edge to chip when overloaded, the load range of the scalepans of the balance is limited. This limitation is a decided inconvenience, necessitating a need for multiple scales to accommodate various load ranges. A further disadvantage of the knife edge is the required elongation thereof in order to provide adequate support to the bearing block carrying the scalepan. The greater length of the knife edge, the greater will be the frictional contact thereof with the associated bearing block. Excessive friction in this respect not only causes chipping, but also decreases the sensitiveness of the apparatus.

An object, therefore, of this invention is to provide in weighing machines, particularly balances, a fulcrum or pivot means of an improved, practical and inexpensive form.

A further object is to eliminate from weighing machines the various disadvantages consequent to the use of knife edges.

More particularly, it is an object of this invention to provide in balances fulcrum or pivot means which do not have the common disadvantages of knife edges, and yet, are practical, serve the purposes intended of fulcrums in balances, and increase the weighing load capacity as well as the sensitiveness of a given balance.

A still further object of this invention is to provide a new and improved fulcrum which can be readily interchanged with or substituted in present balances for the commonly used knife edge.

A still more particular object is to provide points in the spherical surfaces of objects as fulcrums for use in balances in supporting the balance beam and scalepans.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a front elevational view of so much of a balance as may be required to illustrate the invention, and having certain parts in section;

Fig. 2 is an enlarged end view of an arm of the balance;

Fig. 3 is a longitudinal section through the wedge block;

Figs. 4 and 5 are respectively side and plan views of a form of the invention wherein the wedge block shown in Figs. 1 to 3 is replaced by a plate member;

Fig. 6 is a variation in the form of the fulcrum element;

Fig. 7 is a plan view of a wedge block supporting the element of Fig. 6;

Figs. 8 and 9 are respectively side and plan views of a plate member supporting the element of Fig. 6; and Fig. 10 is a further variation in the form of the fulcrum element.

Reference is directed to the several drawings for a more detailed description of the invention, and now particularly to Figs. 1 to 3. In Fig. 1 is shown a balance of conventional type in which the invention is incorporated. The balance includes a supporting column or standard 11 having mounted in its top end an optically flat bearing block 12 on which is centrally fulcrumed at 14 a rigid balance beam 15. The latter carries the usual depending pointer 16, the lower end of which cooperates with a graduate scale, not shown. The ends of the arms 17 of the balance beam are provided transversely thereof with the usual elongated knife-edge slots 18. The latter are disposed in parallel relation to each other.

Instead of the usual knife-edges that would ordinarily occupy the slots 18, there is here fitted in each slot a complementary truncated wedge form block or support 19 formed desirably of brass material. The block is retained in the slot in the usual manner of a conventional knife-edge. The truncated upper portion of each block projects preferably a little out of the slot, and is provided with a flat top face having a pair of spaced pockets or ball cavities 21, one in a direct line rearwardly of the other. In each pocket is seated a fulcrum ball 22. Each ball is retained fast in its pocket by a suitable cement, such as, shellac. The pocket is slightly larger in diameter than the ball member so as to allow room for the cement. Melted shellac is placed in the cavity, then the ball member is properly seated therein. As the ball is seated the shellac rises and fills the cavity about the ball, as at 23. Excess shellac at the bottom of the ball escapes through the port 24 to the outside. The shellac, upon hardening secures the ball fast in the cavity. The arrangement of the balls is such that the uppermost points 25 in the spherical surfaces of the balls of each block are level with each other, and these points in the balls of the blocks of both arms 17 of the balance beam are in the same horizontal plane.

The ball points 25 in each block serve as a fulcrum or pivot for a scalepan carrying member 26. The latter includes an optically flat bearing plate 27 which is retained in the channel of a U frame 28. The bearing plate is formed of hard material of a nature conventionally used for bearing plates in balances. The pivot points 25 of the ball elements support the bearing plate in the areas of the rear and front of the latter, as appears in Fig. 2.

Unitary with the U frame of each scalepan carrying member 26 is a conventional yoke 29 which carries a pivoted hook 31 on which is suspended the usual bow and scalepan here generally indicated by the fragmentary portion of the bow at 32.

The balance is equipped with the usual arresting devices, not shown, for the balance beam and scalepan carrying members.

The ball members 22 are formed of a hard material; such as, sapphire, stone agate, boron carbide, or other hard material conventionally used in the making of a conventional knife-edge.

The ball members 22 will not fly or chip in the manner of conventional knife edges. Accordingly, they are capable of supporting a greater load on the scalepans. They are considerably less expensive, costing but a fraction of what it costs to grind a knife-edge of similar material. The ball members will last almost indefinitely, since they may be rotated as required when the uppermost points 25 thereof have flattened by wear; whereas, the conventional knife-edge must be discarded or sharpened down when worn or chipped. The sensitiveness of the balance beam is greatly increased by using the ball points as pivots, since the balls are highly polished and there is but two points of contact with the associated bearing plate 27. The friction that might develop between the ball points and an optically flat bearing plate is negligible as compared to that arising from the use of the usual knife-edge.

In the form of the invention illustrated and as described above the ball members 22 are mounted in a truncated wedge block 19. This structure makes the wedge block interchangeable with the conventional knife-edge, since the wedge block can readily replace the knife-edge in a slot 18 of a conventional balance beam without the necessity of making any alterations in the latter. The size of the ball members for a particular balance will be dictated by the load to be borne.

In Figs. 4 and 5 a modified form of the invention is illustrated. There, the ball elements 33 are cemented fast, in the manner above described, in complementary cavities 34 formed in a thickened square or plate 35 of lightweight material, such as aluminum. The balls are spaced diagonally apart, and the uppermost points of the balls are in the same level plane. The supporting plate 35 has a flat undersurface which is adapted to rest upon a flat upper face 36 of the arm 38 of a balance beam.

The plate 35 is held fast on the arm of the balance beam by suitable fastening means. The latter includes a pair of screws 39 disposed in diagonally spaced oversize holes 40 of the plate 35. The oversize holes enable the plate to be adjusted as desired in a horizontal plane. The adjusted position is fixed by tightening the screws so as to engage the oversize heads thereof with the surface of the plate. Each plate member 35 that may be located in the balance beam may in this manner be adjusted relative to the others, as desired.

In Fig. 6 a variation 41 in the form of the fulcrum element is shown. It comprises a pair of relatively short end cylinders 42 axially joined by a reduced intermediate portion 43. The cylinders 42 are also formed of hard material, and are highly polished. This form may be cemented in a channel 44 lengthwise of the top of a truncated wedge block 19', as in Fig. 7; or it may be cemented in a channel diagonally of a plate member 35', as in Figs. 8 and 9. While in this form the uppermost length of each cylinder portion is presented to the bearing plate that will pivot thereon, none the less, the extent of such cylinder surface will be materially less than that which would be presented by a conventional knife-edge. A further advantage of this form is that it may be rotated as needed after the uppermost portion thereof has become worn. Accordingly, it is subject to longer use than the conventional knife-edge.

In Fig. 10 a further variation of the fulcrum element is shown in the form of a cylinder, the central area of which has a valley or cutaway 46 whereby a pair of cylindrical end portions 47 are provided. This form may be mounted in a wedge block or plate in the manner of the element shown in Fig. 6. The uppermost areas 48 of the cylinder portions may serve the functions of a fulcrum.

A further advantage peculiar to fulcrums as above described having spherical surfaces is that they serve also the function of a dampening device in arresting the oscillatory action of the balance beam. They accordingly serve to eliminate conventional dampening devices used for this purpose.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is my intent, therefore, to claim the invention not only as shown and described but also in all such forms and modifications as may reasonably be construed to fall within the spirit of the invention and the scope of the appended claims.

I claim:

1. A fulcrum unit interchangeable with a knife edge in a balance beam of a type including a complementary knife edge slot for the knife edge, comprising a wedge-form block interchangeable with the knife edge in the slot and having a truncated flat upper surface having a pair of cavities spaced one rearwardly of the other, a highly polished ball formed of hard material releasably held in each cavity, and the uppermost points in the surfaces of the balls being engageable with a bearing plate, the uppermost points of the balls being level with each other.

2. A fulcrum unit as defined in claim 1, wherein the lower portions of the balls are embedded fast in shellac in the cavities, and the balls are subject to adjustment upon loosening of the shellac so as to change the angular position of the uppermost points of the balls relative to the bearing plate after these points have become worn.

3. A fulcrum unit as defined in claim 1 wherein the cavities are substantially semi-circular and of a diameter slightly greater than that of the balls, and the balls are seated and held fast in shellac cement which fills the cavity clearance about the balls.

4. For use in a precision balance of the character described including an optically flat bearing plate and a knife edge engaging the bearing plate and occupying a complementary knife edge slot in the balance; a fulcrum unit comprising a block interchangeable with the knife edge in the slot, a pair of shallow cavities formed in the block in spaced relation to one another, and a highly polished ball of hard material partly embedded and held fast in shellac in each cavity and having the uppermost point in its sphere engageable with the bearing plate.

5. In a precision balance as in claim 4, wherein the balls are rotatable in the cavities upon softening of the shellac whereby the disposition of the uppermost points of the balls may be angularly adjusted relative to the bearing plate.

6. In a precision balance of the character described including in combination a balance beam arm, an optically flat bearing plate adapted to accommodate a scale pan, and a fulcrum for the bearing plate, wherein the fulcrum is a separate unit comprising a base block detachably mounted to the balance beam arm, a pair of shallow cavities formed in the block in spaced relation to each other, and a highly polished ball removably locked in hardened shellac about its lower area in each cavity and having the uppermost point of its sphere engaging the bearing plate.

7. A fulcrum unit of the character described for serving as a pivot support to an optically flat bearing plate, comprising an elongated cuneiform block adapted to be disposed in a complementary knife edge slot of a balance beam of a precision scale and having an upper flat surface lengthwise thereof in parallel relation to its base but relatively narrower, a pair of shallow cavities formed in this upper surface in spaced relation to each other, a highly polished ball of hard material seated in each cavity and having a diameter slightly less than that of the cavity whereby a close clearance is provided between the ball and the surrounding wall of the cavity, and a non-metallic cementitious material filling the clearance and releasably locking the ball in the cavity, and the uppermost points in the spheres of the balls being level with one another and adapted to engage as pivot points with an optically flat bearing plate.

8. In a weighing machine as in claim 6, wherein the base block is a square plate in form, the cavities are diagonally opposed to each other, and screw and slot means in each of the other diagonally opposed corners of the square plate detachably secure the latter to the balance beam arm, and each slot being oversize relative to the shank of the screw and undersize relative to the head of the screw, whereby the position of the square plate upon the support may be adjusted in a horizontal plane.

References Cited in the file of this patent

UNITED STATES PATENTS

| | | |
|---|---|---|
| 2,375,322 | Pierce | May 8, 1945 |
| 2,594,581 | Phelps | Apr. 29, 1952 |
| 2,626,796 | Seederer et al. | Jan. 27, 1953 |
| 2,685,482 | Hadley | Aug. 3, 1954 |